(12) United States Patent
McCarter et al.

(10) Patent No.: US 10,408,365 B2
(45) Date of Patent: Sep. 10, 2019

(54) TUBING BUNDLE SUPPORTS AND SUPPORT SYSTEMS

(71) Applicant: O'Brien Holding Co., Inc., St. Louis, MO (US)

(72) Inventors: Marcus C. McCarter, Catawissa, MO (US); Aaron M. Allen, Edwardsville, IL (US)

(73) Assignee: O'BRIEN HOLDING CO., INC., St. Louis, MO (US)

( * ) Notice: Subject to any disclaimer, the term of this patent is extended or adjusted under 35 U.S.C. 154(b) by 0 days.

(21) Appl. No.: 15/494,242

(22) Filed: Apr. 21, 2017

(65) Prior Publication Data

US 2017/0307109 A1 Oct. 26, 2017

Related U.S. Application Data

(60) Provisional application No. 62/487,929, filed on Apr. 20, 2017, provisional application No. 62/325,862, filed on Apr. 21, 2016.

(51) Int. Cl.

| | |
|---|---|
| *F16L 3/22* | (2006.01) |
| *F16L 7/00* | (2006.01) |
| *F16L 3/10* | (2006.01) |
| *F16L 3/223* | (2006.01) |
| *F16L 3/16* | (2006.01) |
| *F16L 3/227* | (2006.01) |

(Continued)

(52) U.S. Cl.
CPC .............. *F16L 3/22* (2013.01); *F16L 3/1091* (2013.01); *F16L 3/16* (2013.01); *F16L 3/221* (2013.01); *F16L 3/222* (2013.01); *F16L 3/223* (2013.01); *F16L 7/00* (2013.01); *E02F 9/2275* (2013.01); *F03D 80/85* (2016.05); *F16L 3/227* (2013.01); *F16L 3/2235* (2013.01); *F16L 55/035* (2013.01)

(58) Field of Classification Search
CPC ... H02G 3/32; H02G 3/22; H02G 3/30; F03D 80/80; F03D 80/85; F16L 3/08; F16L 3/2235; F16L 3/227; F16L 3/223; F16L 3/22; F16L 3/221; F16L 3/222; E02F 9/2275
USPC .................................................. 248/68.1, 67.5
See application file for complete search history.

(56) References Cited

U.S. PATENT DOCUMENTS 3,458,163 A * 7/1969 Egerton-Smith ........ H02G 3/32
174/155
3,476,868 A * 11/1969 Williams ................. H02G 7/12
174/146

(Continued)

FOREIGN PATENT DOCUMENTS

DE 19628689 A1 * 1/1998 ................ F16L 3/16
DE 202014101617 U1 * 7/2015 ............... H02G 3/30

(Continued)

*Primary Examiner* — Eret C McNichols
(74) *Attorney, Agent, or Firm* — Sandberg Phoenix & von Gontard PC (57) ABSTRACT

Tubing bundle supports comprise body parts clamped around split rotatable sleeves. In one embodiment, spring mounted peripheral shoes and rotatable tubing bundle support sleeves allow metal tubes and tubing bundles to be routed inside a conduit in spaced apart positions and resistant to vibration. In another embodiment, split pillow block sections are clamped around a split rotatable sleeve. In an embodiment, the split pillow block support is held to a strut channel by a strut channel nut.

15 Claims, 6 Drawing Sheets

(51) Int. Cl.
*F03D 80/80* (2016.01)
*E02F 9/22* (2006.01)
*F16L 55/035* (2006.01)

(56) References Cited

U.S. PATENT DOCUMENTS

| | | | | |
|---|---|---|---|---|
| 4,477,205 A | | 10/1984 | Morrill et al. | |
| 5,261,633 A | * | 11/1993 | Mastro | F16L 3/18 |
| | | | | 248/68.1 |
| 5,789,707 A | * | 8/1998 | Damm | H02G 15/113 |
| | | | | 174/650 |
| 5,792,991 A | * | 8/1998 | Nolf | H02G 15/013 |
| | | | | 174/138 G |
| 6,053,456 A | * | 4/2000 | Dispenza | F16L 5/10 |
| | | | | 248/56 |
| 6,248,953 B1 | * | 6/2001 | Miller | H02G 15/013 |
| | | | | 174/74 R |
| 6,561,466 B1 | * | 5/2003 | Myers | F16L 3/221 |
| | | | | 248/68.1 |
| 7,015,394 B2 | * | 3/2006 | Desard | H02G 15/013 |
| | | | | 174/100 |
| 7,534,965 B1 | * | 5/2009 | Thompson | H02G 3/22 |
| | | | | 16/2.1 |
| 8,604,360 B2 | * | 12/2013 | Knorr | G02B 6/4444 |
| | | | | 174/564 |
| 8,857,522 B2 | | 10/2014 | Arrazola et al. | |
| 2002/0012582 A1 | * | 1/2002 | Kirkegaard | H02G 7/00 |
| | | | | 415/4.3 |
| 2004/0080119 A1 | * | 4/2004 | Goll | F16L 5/08 |
| | | | | 277/607 |
| 2004/0256138 A1 | * | 12/2004 | Grubish | G02B 6/4442 |
| | | | | 174/93 |
| 2007/0079969 A1 | * | 4/2007 | Allenworth | E21B 17/1035 |
| | | | | 166/368 |
| 2007/0120023 A1 | * | 5/2007 | Martinez | E02F 9/2275 |
| | | | | 248/75 |
| 2007/0246613 A1 | * | 10/2007 | Kennedy | H02G 3/32 |
| | | | | 248/56 |
| 2010/0258687 A1 | * | 10/2010 | Celikkol | F16L 3/222 |
| | | | | 248/74.4 |
| 2011/0042529 A1 | * | 2/2011 | Walter | F16L 3/223 |
| | | | | 248/68.1 |
| 2015/0001354 A1 | * | 1/2015 | Brabander | H02G 3/0462 |
| | | | | 248/69 |
| 2015/0222106 A1 | * | 8/2015 | Caspari | H02G 3/32 |
| | | | | 174/651 |
| 2015/0260166 A1 | * | 9/2015 | Olesen | H02G 1/14 |
| | | | | 290/55 |
| 2015/0337992 A1 | | 11/2015 | McCarter | |
| 2016/0322793 A1 | * | 11/2016 | Cuppen | H02G 3/32 |
| 2018/0216753 A1 | * | 8/2018 | Hughes | F16L 3/10 |

FOREIGN PATENT DOCUMENTS

| | | | | |
|---|---|---|---|---|
| DE | 202015104363 U1 | * | 10/2015 | ............ F16L 3/18 |
| EP | 1344968 A2 | * | 9/2003 | ............ F16L 3/2235 |
| EP | 3284992 A1 | * | 2/2018 | ............ F16L 3/1058 |
| GB | 2255453 A | * | 11/1992 | ............ F16L 3/22 |
| JP | 2001041353 A | * | 2/2001 | ............ F16L 3/08 |
| WO | WO-2017052312 A1 | * | 3/2017 | ............ C23F 13/00 |

* cited by examiner

TUBING BUNDLE SUPPORTS AND SUPPORT SYSTEMS

CROSS-REFERENCE TO RELATED APPLICATIONS

This application claims the benefit of U.S. Provisional application 62/487,929, filed Apr. 20, 2017, and U.S. Provisional application 62/325,862, filed Apr. 21, 2016, both of which are hereby incorporated by reference in their entirety.

STATEMENT REGARDING FEDERALLY SPONSORED RESEARCH

Not applicable.

BACKGROUND OF THE INVENTION

The present invention relates to a support system for positioning and supporting non-circular linear elements, such as tubing bundles, electrically heated tubing, multi-wire electric cables, and the like. Such elements have a cross-section with a major dimension and a minor dimension. They require support at minimum intervals ranging from six inches to twenty feet.

In many applications, including off-shore platforms and many on-shore refineries, chemical plants, and the like, linear elements like tubes, tubing bundles, and the like, are routed through the facility, sometimes in conduits. The tubes are prone to rubbing against each other or against the wall of the conduit, particularly when the conduit bends or when it is subject to vibration, as may be caused by wind, waves, or seismic events. Abrasion of the tubes or of the conduit by the tubes may lead to corrosion or leaks. The problem is compounded when larger diameter tubing (one-quarter inch diameter and up) is shipped in coils to the job site, thereby taking a permanently curved set, or when plural tubes are surrounded by a common jacket to form a tubing bundle. The problem is further compounded when the tubing package includes tracing or multiple tubes, and the linear element is therefore non-circular in cross-section.

One example of such an application is an offshore production facility in which a subsurface isolation valve is controlled by hydraulic piping extending from above surface along a hollow leg of the facility to the valve. The leg may have a considerable length, often from twenty-five to two hundred feet. A typical example is a generally vertical leg having a length of one hundred fifty feet from an above-surface production platform or deck to a subsurface porch supporting the valve. Tubing bundles containing two or more stainless steel tubes, illustratively having a half-inch diameter, may constitute the hydraulic piping. In such a facility, the weight of the tubing itself requires substantial support. Such facilities are well known. Examples are shown in Arrazola et al., U.S. Pat. No. 8,857,522 and Morrill, U.S. Pat. No. 4,477,205.

Both inside a conduit and outside a conduit, such non-circular linear elements require special care when they must make a turn, in order to avoid kinking or excess bowing of the tubes. In making a turn relative to in any direction other than around the shortest cross-sectional dimension, the linear element must be allowed to twist. Conventional supports limit twisting to reaches between supports.

SUMMARY OF THE INVENTION

The present invention provides an easily applied support or spacer including at least one rotatable bearing for supporting and/or positioning a linear element. The term "Support" is used herein to mean a device which performs either a supporting or a positioning function, or both.

Preferably, the support includes a body having one or more rotatable sleeves therein. Each sleeve is preferably round in plan view, with an opening therethrough sized and shaped to accept a non-circular linear element, such as a tubing bundle, therethrough. Preferably, the body is formed in identical sections which are bolted or clamped to each other around the sleeve or sleeves to form a seat for the rotatable sleeve. The sleeves are also preferably formed in identical sections which are held together by protrusions and recesses in the sleeve sections and by being clamped between body sections. Preferably a groove is formed on the periphery of the body openings or periphery of the sleeve, and a complementary circumferential spine is formed in the other of the sleeve or body, to limit axial movement of the sleeve relative to the body. Because the body and sleeve are formed in sections, support may be assembled around a non-circular linear element, without requiring the linear element to be threaded through the support. Further, assembling the support around the linear element allows the element to be clamped as part of the assembly process, while still allowing the linear element to rotate relative to the support.

In an embodiment, the invention provides a system of supports to allow metal tubes, tubing bundles, and cables to be routed inside a conduit. Illustrative applications are off-shore applications as well as on-shore. In one embodiment of the invention, a conduit is attached to a leg of a floating off-shore facility, and tubing bundles are run through the conduit, supported by a rotatable support of the invention. Each support serves as a guide to separate the tubes or tubing bundles and to allow rotation of the tubes or tubing bundles as needed to accommodate bends in the conduit. These supports also dampen the transmission of vibration of the conduit to the tube or tubes, illustratively using internal springs of a sufficient strength to absorb the shock. Vibration of the conduit is typically caused by wave action, wind action, other seismic action, marine life collisions, or boat collisions. Multiple supports act as a system which provides structural support to the tubes or tubing bundles. Installation is preferably by assembling the supports along pre-straightened tubes or tube bundles, preferably at thirty to forty-five inch spacings. Using a center support cable, the assembly is then pulled into the conduit.

In an embodiment, the body is supported by a plurality of resiliently-loaded peripheral shoes which are proportioned to engage the interior of a conduit and to provide a cushioned suspension for the body and for the linear elements, such as tubing bundles, held in the sleeves. The shoes are preferably made of a plastic material. They permit rotation and lateral movement of the body relative to the conduit. The shoes may be loaded by coil, leaf, or torsion springs, by resilient pads, or by other means known in the art. The sleeves are preferably made of a plastic material and preferably are proportioned to clamp a tubing bundle passing therethrough and to hold the tubing bundle rotatably relative to the support body. This arrangement, allowing rotation of both the support body relative to the conduit and of the sleeve-clamps relative to the support body, permits the tubes and tubing bundles to go around corners, even when the tubing has become set from coiling prior to installation. When the assembly rounds a curve the support is able to twist such that each tubing bundle remains the same length as the other bundles, and each tubing bundle can twist to allow it to make the turn without kinking. The freedom of movement of the support and of the sleeves in the support also allows flexing of the bundles with seismic or thermal stress.

In an embodiment, a support plate at the top of the conduit supports the tubing bundles after installation, and the center support cable supports the rotatable supports through cable clamps adjacent to each rotatable support.

In another embodiment, the support body is in the form of a split pillow block formed of two body sections clamped together to carry a single split rotatable bearing. In an embodiment, the split bearing has two circumferential spines rotating in two circumferential grooves in the body. Protrusions in the free ends of the body sections mate with depressions in the other half of the body, and protrusions in the free ends of the bearing sections mate with depressions in the other half of the bearing to keep the body sections aligned and the bearing sections aligned. In an embodiment, the body sections are clamped together by through bolts, and are held to an underlying support structure by strut channel clamps. In an illustrative form of this embodiment, the support is held to an underlying structure in the manner described in co-owned pending United States published application US 2015/0337992 A1, Nov. 26, 2015, incorporated herein by reference.

In preferred embodiments, the sleeve remains rotatable after the body is clamped around the sleeve. In other embodiments, the body is allowed to rotate during installation, but is then clamped in a fixed rotational position once the body is clamped around the sleeve.

Other aspects of the invention will be apparent to those skilled in the art in light of the following description of illustrative embodiments of the invention.

BRIEF DESCRIPTION OF THE SEVERAL VIEWS OF THE DRAWINGS

In the accompanying drawings which form part of the specification.

DESCRIPTION OF THE PREFERRED EMBODIMENT(S)

The following detailed description illustrates the invention by way of example and not by way of limitation. The description clearly enables one skilled in the art to make and use the invention, and describes several embodiments, adaptations, variations, alternatives, and uses of the invention, including what is presently believed to be the best mode of carrying out the invention.

Illustrative embodiments of the bundle spacer and tube support system of the invention are shown and described in the accompanying drawings. Their construction, mode of operation, and assembly will be immediately apparent to those skilled in the art.

Referring now to FIGS. 1-4, a tubing bundle spacer 1 in accordance with an embodiment of the invention includes a body 3 divided into four identical quadrants or sectors 5. The body sectors 5 are illustratively formed of a plastic material such as an acetal or nylon. Each body sector 5 has an ear 7 at each outer corner and an arcuate cutout 9 at its inner end. Each sector 5 further includes a semicircular cutout 11 in each of its radial sides 13. Each cutout 11 includes a central annular groove 15. An ovoid shoe 17 is resiliently mounted to each body sector 5 by pins 19 and E-clips 21 extending through slots 23 in sides of the shoes 17. The shoes 17 are illustratively formed of a plastic material such as an acetal or nylon. Resiliency is provided by any method, such as a spring 25 between an inner face of the shoe 17 and a seat 27 in an outer, peripheral face 29 of the sector 5. A resilient plug, such as a plug formed of polyurethane having a Durometer hardness of about 80 A may, for example, be the spring 25.

Rotatable bundle clamps 31 are formed of two U-shaped sections 33, each having a semicircular periphery and an inner opening chosen to form a snug but slidable fit with an elongate element 71 extending through it. The elongate element 71 is illustratively a two-tube tubing bundle with a polymeric thermoplastic jacket, such as a tubing bundle containing two one-half-inch tubes with 0.065" thick 2507 super-duplex stainless steel walls, sold by O'Brien-Ametek as its MJ2U-AR4. The bundle clamps 31 are illustratively formed of a plastic material such as an acetal or nylon. One free end of each U-shaped section 33 includes integral pins 35, and the other free end includes complementary depressions 37, allowing the two U-shaped sections 33 to be pushed together to form the bundle clamp 31. An annular spine 39 on the outer periphery of each rotatable sleeve section 33 of clamp 31 forms a rotatable fit with the annular groove 15 of the body section 5. When the sleeve sections 33 are pushed together, the outside radius of the sleeve 31 is the same as the inside radius of the cutouts 11 in the body sectors 5, thereby allowing the clamps 31 to rotate freely.

Figure 3:
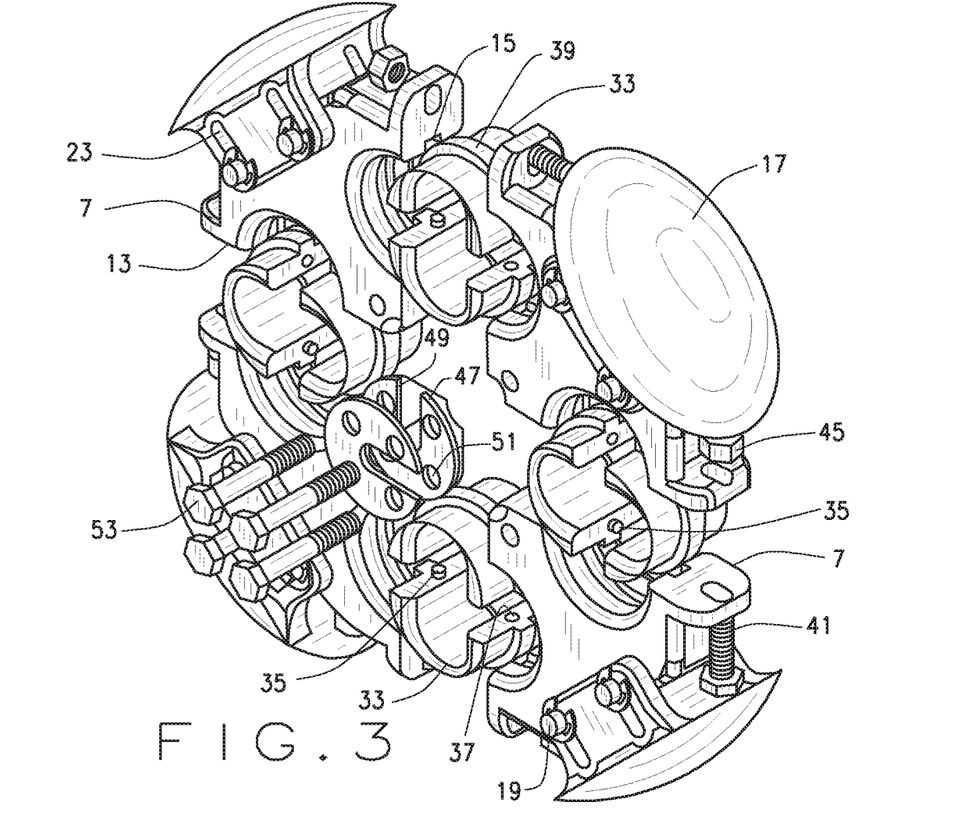
FIG. 3 is an exploded view in perspective of the tubing bundle spacer of FIGS. 1 and 2, showing the parts ready for assembly around four tubing bundles and a support cable.

When the rotatable clamp sections 33 have been pushed together over four tubing bundles 71, and a support cable 73 has been run between the tubing bundles 71 (see FIG. 10), the spacer body sectors 5 are assembled around the rotatable clamps 31 and cable 73 as described in more detail hereafter, and the sections are secured to each other by running bolts 41 through openings 43 in the ears 7 and securing them with nuts 45.

Figure 1:
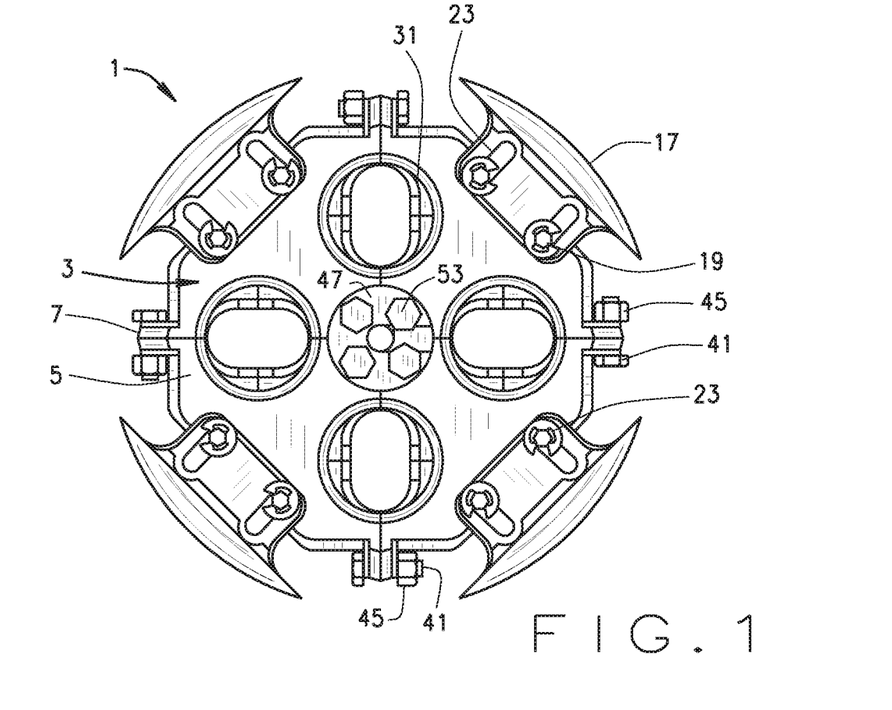
FIG. 1 is a top plan view of a tubing bundle spacer in accordance with the present invention.
Figure 2:
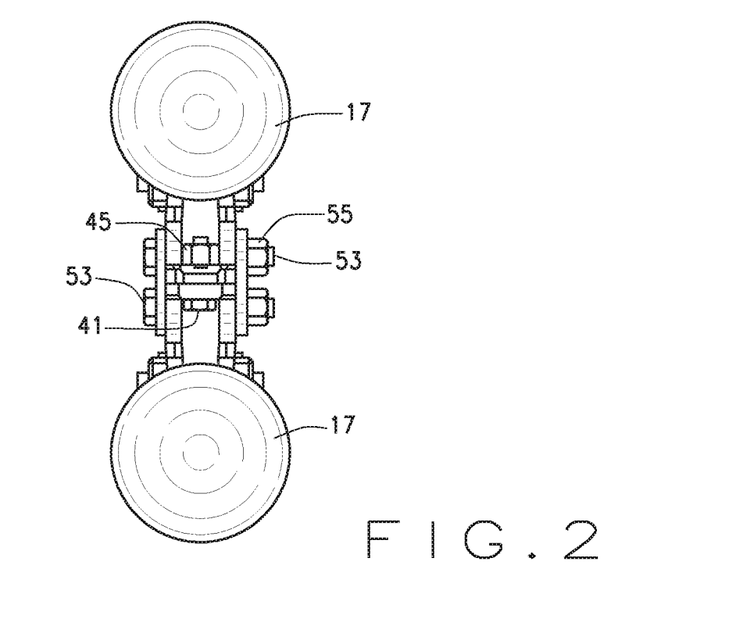
FIG. 2 is a view in right side elevation of the tubing bundle spacer of FIG. 1.

At the center of the bundle spacer 1, two washers 47 on each side of the body include slots 49 sized to fit support cable 73 and four bolt holes 51 sized to accept bolts 53 secured by nuts 55. The washers 47 are turned 90° with respect to each other. The washers 47 thus lock the sectors 5 to each other at their inner ends, and provide a bearing surface for a cable clamp 75 as described hereinafter.

Figure 5:
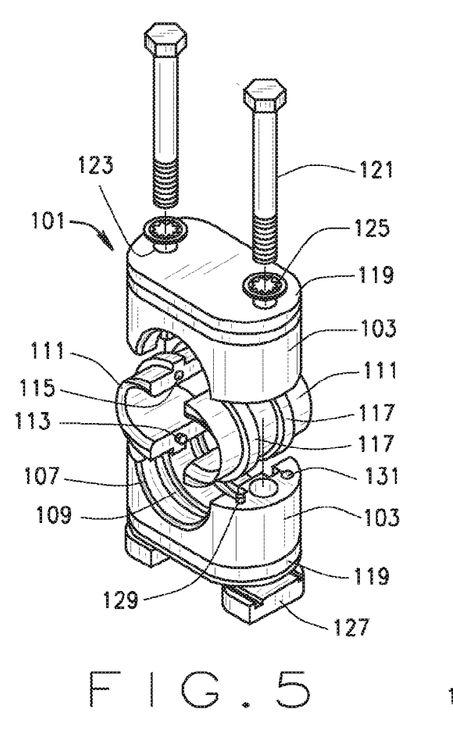
FIG. 5 is a view in exploded perspective of an elongate element support in accordance with second embodiment of the invention, for supporting a tubing bundle to a structural support, showing the elongate element support disassembled.

In accordance with a second embodiment of the invention, a support 101 for elongate elements such as tubing bundles is provided for attachment to the exterior of a support structure.

As shown in FIG. 5, each support 101 is a split pillow block comprising two identical body blocks 103 supporting between them a rotating sleeve (bundle bearing) 105. The blocks 103 are illustratively formed of a plastic material such as an acetal or nylon. Each body block 103 has a semicircular cutout 107 on one side, forming arms on either side of the cutout. Each cutout 107 includes two spaced apart annular grooves 109.

The rotatable sleeves 105 are formed of two U-shaped sections 111, each having a semicircular periphery and an inner opening chosen to form a snug fit with the elongate element extending through it, illustratively a two-tube tubing bundle with a polymeric jacket, such as a tubing bundle sold by O'Brien-Ametek as its MJ2U-AR4. The bundle sleeves 105 are illustratively made of a polyoxymethylene homopolymer sold under the trademark Delrin® by E. I. DuPont De Nemours and Company. Unlike the clamps 31 of the first embodiment, the fit in this embodiment may if desired be sized to grip the tubing bundle 71 and prevent slippage of the bundle 71 through the sleeve 105. One free end of each U-shaped section 109 includes integral pins 113, and the other free end includes complementary depressions 115, thereby allowing the two U-shaped sections 109 to be pushed together to form the bundle sleeve. Two spaced-apart annular spines 117 on the outer periphery of the rotating sleeve 105 fit in the grooves 109 of the cutouts 107 in the blocks 103. When the bundle sleeves are pushed together, the outside radius of the bundle sleeve 105 is the same as the inside radius of the cutouts 107 in the blocks 103.

In use, the bundle sleeve sections 111 are assembled around a tubing bundle 71, the blocks 103 are assembled around the sleeve, and fluoropolymer-coated stainless steel press plates 119 are positioned outside the blocks. The fluoropolymer is illustratively a Xylan® coating (Whitford Corporation). Bolts 121 are then inserted through holes 123 extending through the blocks, using stainless steel internal tooth lock washers 125, and threaded into strut nuts 127. The bolts 121 are tightened sufficiently to capture the bundle sleeve 105. Protrusions 129 in the free ends of the body sections 103 mate with depressions 131 in the other body section 103 to keep the body sections aligned.

In some embodiments, the sleeve 105 remains rotatable after the body blocks 103 are clamped around the sleeve. In other embodiments, the sleeve is allowed to rotate during installation, but is then clamped in a fixed rotational position once the body blocks 103 are clamped around the sleeve. This is conveniently accomplished by slightly shortening the arms of the blocks 103; the bolts may then be tightened finger-tight to allow rotation of the bundle sleeves or tightened with a wrench to lock the bundle sleeves against rotation.

The strut nuts 127 are turned 90° and inserted into the strut channel part of an assembly like that shown in FIGS. 5 and 16 of the previously mentioned published application US 2015/0337992 A1. The strut nuts 127 are then returned to the position shown in FIG. 5, the support 101 is slid into its desired position in the strut channel, and the bolts 121 are tightened to lock the rotatable support 101 in position and, optionally, to lock the bundle sleeve 105 against further rotation.

Figure 6:
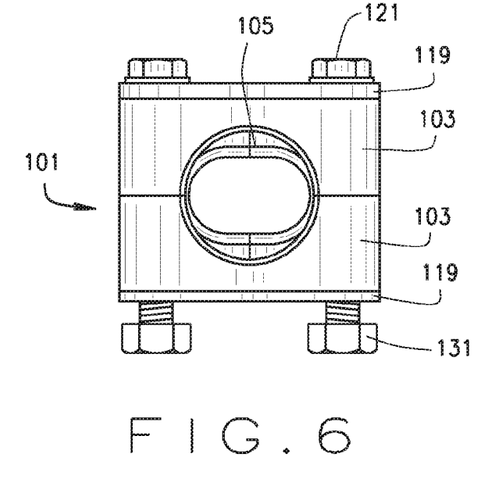
FIG. 6 is a view in front elevation of the assembled support of FIG. 5, modified by substituting a lock nut for a strut channel nut of FIG. 5.

As shown in FIG. 6, the tubing support 101 may be held to a structural support (a support which is fixed with respect to a larger structure) in more conventional ways, such as by running the bolts 121 through openings in the support structure and securing the support 101 with lock nuts 131.

Figure 7:
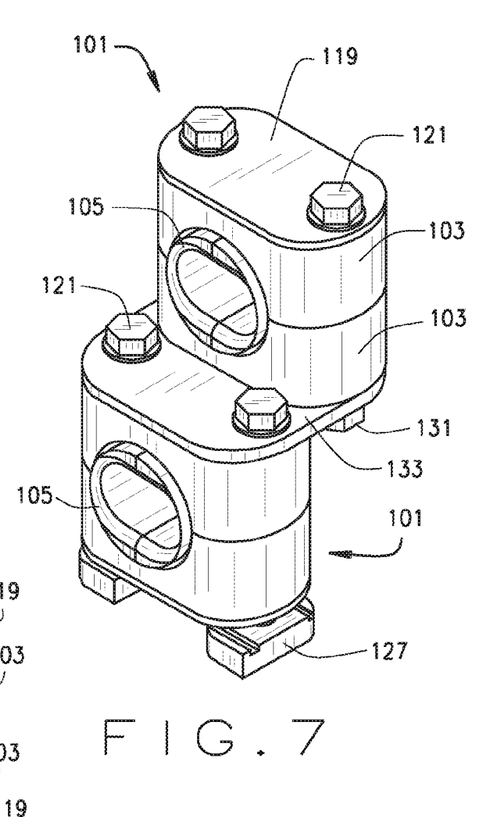
FIG. 7 is a view in perspective of two elongate element supports of FIG. 5, mounted so that one supports the other, to support two parallel elongate elements.

As shown in FIG. 7, two of the external tubing bundle supports 101 of this embodiment may be stacked to form an assembly that carries parallel tubing bundles 71. The upper press plate 119 of the lower bundle support 101 is replaced by a larger press plate 133 which also acts as the lower press plate of the upper bundle support.

FIGS. 8-16 show an illustrative installation utilizing both the spacer 1 of the first embodiment and the external bundle supports 101 of the second embodiment. The assembly process in this embodiment involves construction of an entire control tubing system for an off-shore oil platform.

Figure 4:
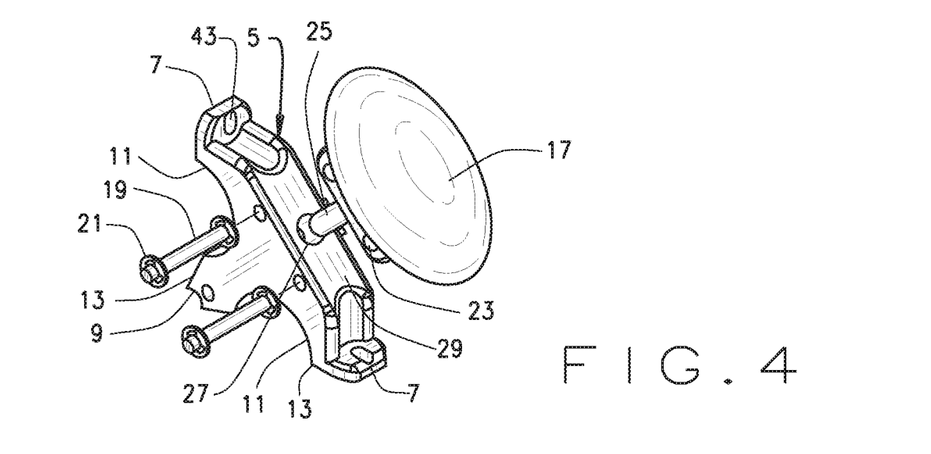
FIG. 4 is a view in exploded perspective, corresponding to FIG. 3, of a spacer body sector and shoe pre-assembly of the tubing bundle spacer of FIGS. 1-3.

The body sectors 5, spring 25, shoes 17, pins 19, and E-clips 21 of the first embodiment are pre-assembled as shown in FIG. 4. That assembly and the other parts of the bundle spacer 1 are bagged and shipped to the job site for installation of tubing bundles in a conduit 70, illustratively through a one-hundred-fifty foot long eight-inch conduit attached to a leg of a floating off-shore oil platform, for connection of hydraulic controls above sea level to three hydraulic shut-off valves laterally spaced from the leg, on a porch of the platform submerged about seventy-five feet and sitting on four pontoons. Such an installation requires about fifty spacers 1, spaced apart about three feet. The spans of tubing bundles from the control to the leg and from the leg to the hydraulic shut-off valves are carried by the bundle supports 101, which are also bagged unassembled and shipped to the job site.

Figure 8:
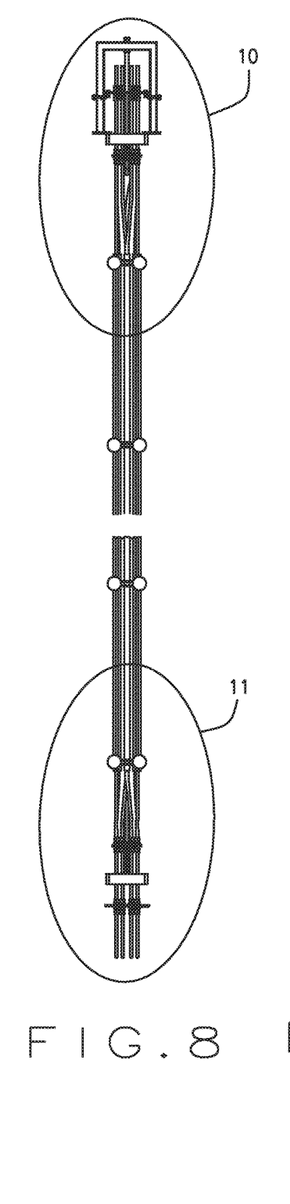
FIG. 8 is a view in front elevation of an assembly of tubing bundles and a tube support system including tubing bundle spacers in accordance with FIGS. 1-4 and a support cable positioning the tubing bundle spacers, the assembly being sized to run through a 150' long 8" conduit attached along a leg of an off-shore oil platform.
Figures 14, 15, 16:
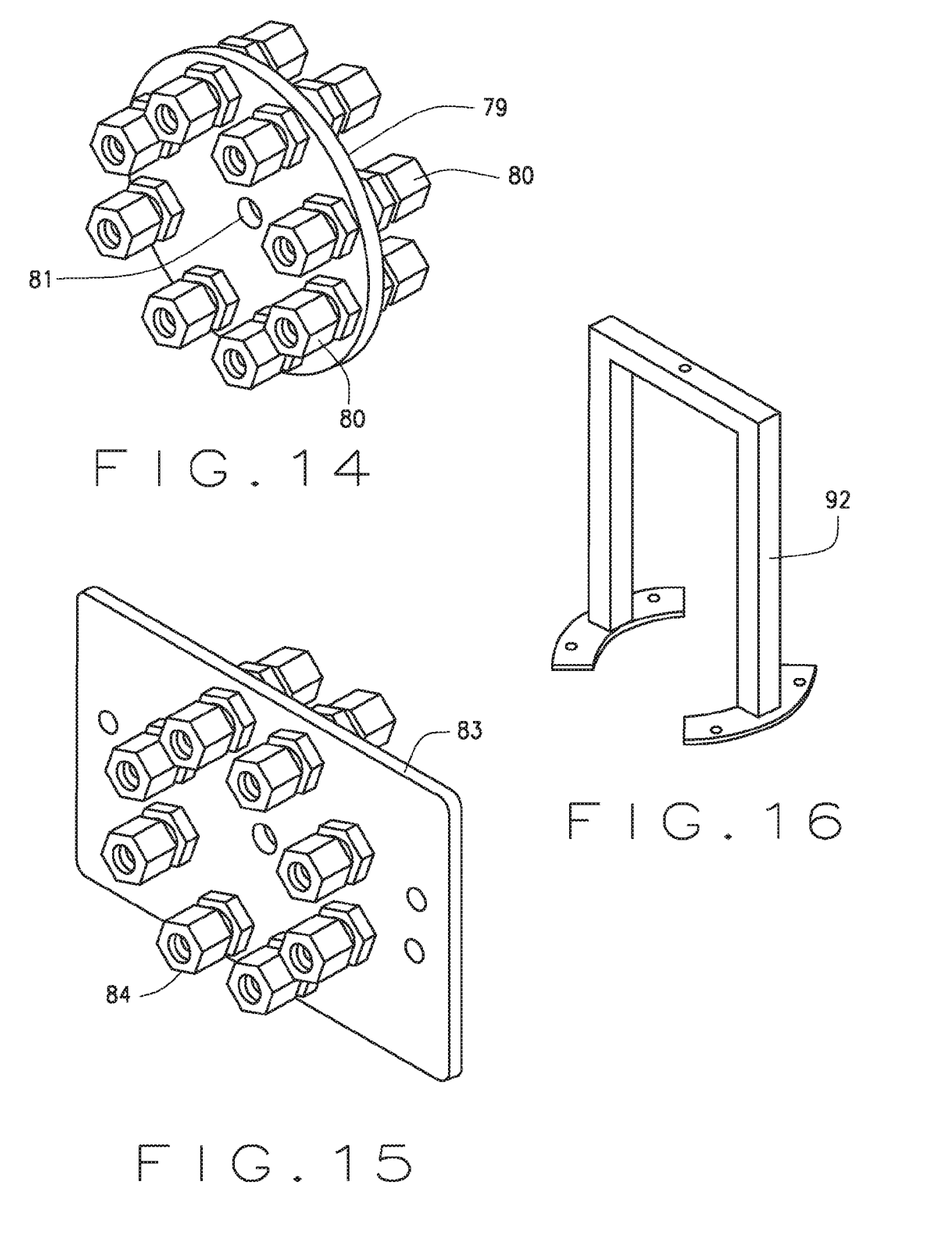
FIG. 14 is a view in perspective of a lifting plate of the embodiment of FIGS. 8-11.
FIG. 15 is a view in perspective of a stab plate of the embodiments of FIGS. 8-11.
FIG. 16 is a view in perspective of a support yoke of the embodiments of FIGS. 8-11.

Tubing bundles 71 are pulled from their spools through a tube straightener and supported on pipe stands. A length of jacketing is removed from each bundle to expose tubing 77 at the lower end of the finished assembly. A support plate 79 is attached to the exposed tubing 77 using through-fittings 80. Support cable 73 is threaded through a center hole 81 of the support plate and laid into place between the tubing bundles 71. A stab plate 83 is temporarily attached to the (lower) ends of the tubes 77 using fittings 84 to ensure alignment of the tubes 77.

Figure 9:
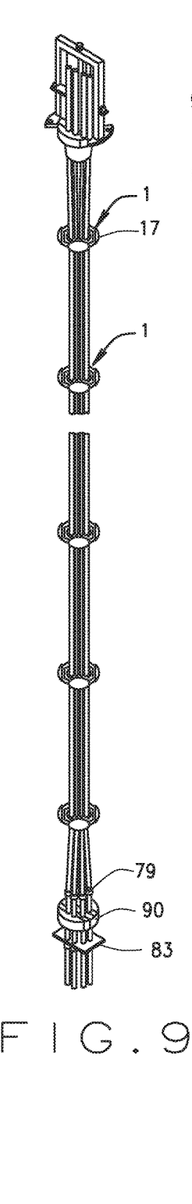
FIG. 9 is a view in perspective of the tubing bundle assembly of FIG. 8.

A first bundle spacer 1 is then assembled onto the four sheathed tubing bundles 71, near their lower ends. One of the pairs of bundle clamp halves 33 is assembled around one bundle 71 to form a rotatable clamp 31, and two of the body sectors 5 are assembled around it and clamped by being bolted together with bolts 41 and nuts 45. A second pair of bundle clamp sections 33 is similarly assembled around the opposed bundle 71 to form a rotatable clamp 31 and the other two body sections 5 are clamped around it. The third and fourth pairs of bundle clamps 33 are then assembled around the other two bundles 71, and the two halves of the body 3 are clamped together with bolts 41 and nuts 45. The washers 47 are then installed on opposed sides of the body, around the cable, and are secured with bolts 53 and nuts 55. Cable clamps 75 are attached to a short bare section of the cable, from which the protective coating has been stripped, on either side of the assembled body 1 to prevent the assembled bundle spacer 1 from slipping up or down the cable 73.

More rotatable bundle spacers 1 and cable clamps 75 are similarly attached to the tubing bundles 71 and cable 73, at intervals of about three feet, to form a tubing bundle assembly before beginning to feed the bundle assembly into the one-hundred-fifty foot conduit which will be attached to a leg of a drilling platform. If space allows, all the spacers 1 may be attached to form a complete bundle assembly before the assembly is fed into conduit 70. Before feeding the bundle assembly into the conduit, the stab plate 83 is removed.

Inserting the bundle assembly into the conduit is aided by a fish tape attached to a rope, which is in turn attached to the lower end of the cable. A temporary compression cone is attached to the upper end of the conduit to compress the shoes 17 as the bundle assembly is pulled into the conduit by the rope. In this illustrative embodiment, the conduit changes inner diameter to ⅝" smaller approximately eighty feet below its top. Therefore, the length of the springs or urethane plugs is altered between the spacers 1 above and below the diameter change to maintain a constant spring force.

Figure 10:
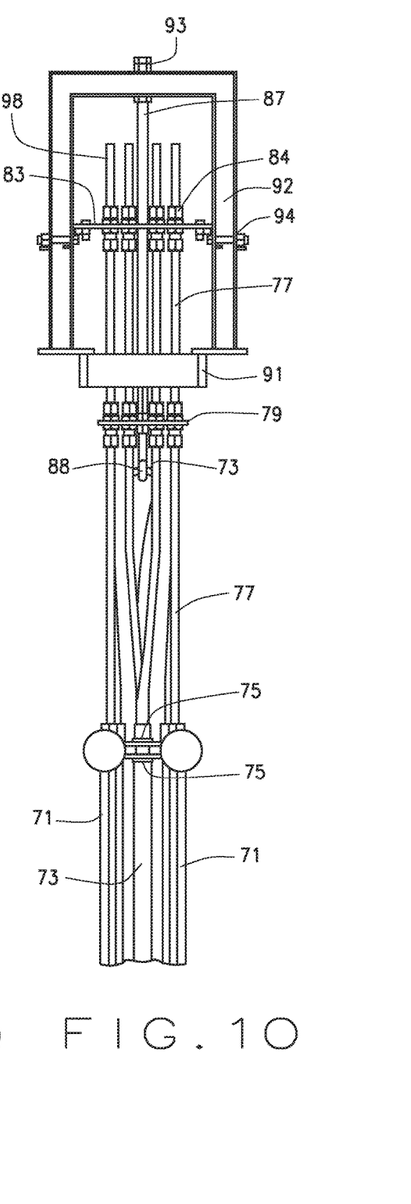
FIG. 10 is a detail of an upper portion of the tubing bundle assembly of FIG. 8.

When the entire bundle assembly has been pulled through the conduit 80, stab plate 83 is again temporarily placed on the lower exposed tubes 77 to establish the final position of the bundle assembly. The bundle assembly is pulled up until the lower stab plate 83 engages the lower end of the conduit 70, and the upper end is marked. The lower stab plate is removed, and the bundle assembly is pulled back partially. Sheathing (jacketing) is removed from upper ends of the bundle assembly, and an upper support plate 79 is installed. A support rod 87 is inserted through the center of the support plate 79 and the upper end of the cable 71 is looped through an eye 88 of the support rod 87 and held with cable clamps 75.

Figure 11:
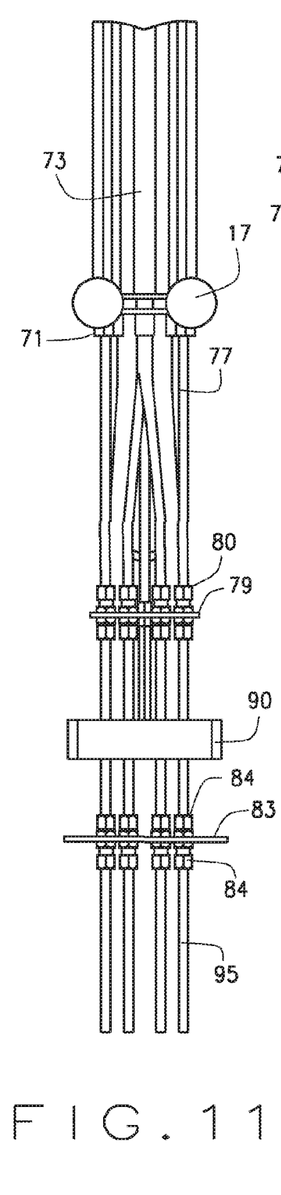
FIG. 11 is a detail of a lower portion of the tubing bundle assembly of FIG. 8.

The bundle assembly is then pulled down to permit final assembly of the lower stab plate 83 to the lower ends of the tubing bundles, below the end of the cable 73. The bundle assembly is then pulled up to its final position. The lower end of the cable 73 is pushed up into the conduit 70, and a water-tight fitting 90 is assembled onto the exposed tubing at the lower end of the bundle assembly, above the lower stab plate 83, through a cutout in the bottom of the conduit 70. The fitting 90 is illustratively a multi-strip Brattberg seal (MCT Brattberg AB, SE-371 92 Karlskrona, Sweden).

A second Brattberg seal 91 is attached at the upper end of the bundle assembly to stripped tubes 77 and to the support rod 87 at the top of the conduit.

A yoke 92 is assembled to the top of the conduit, a top stab plate 83 is slidably mounted on the yoke, and the support rod is tightened with lock nuts 93 into an upper reach of the yoke 92. Tightening the support rod lifts the upper support plate 79 and tensions the tubes 77, thereby straightening the tubes. The upper Brattberg seal 90 and the upper stab plate 83 are then tightened, and the upper stab plate 83 is clamped to sides of the yoke 92 as indicated at 94.

Figures 12, 13:
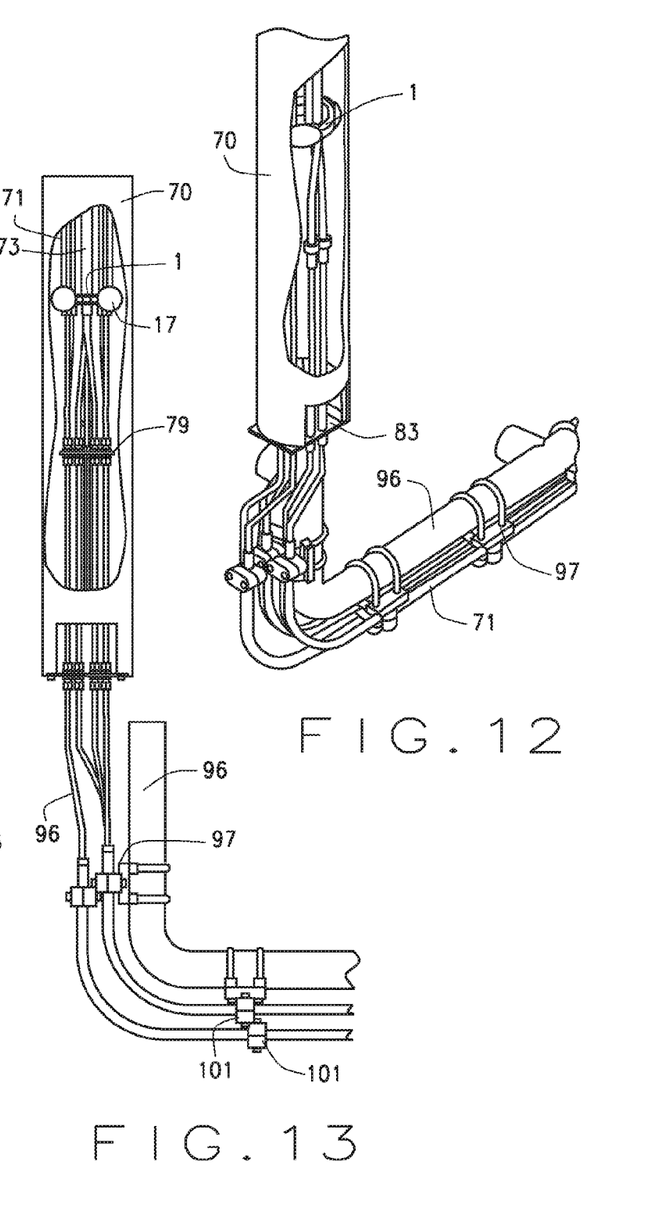
FIG. 12 is a view in perspective, partially broken away, of a transition at the lower end of the conduit, from the tubing support system of FIGS. 1-4 to an external tubing bundle support system in accordance with the embodiment of FIGS. 5-7.
FIG. 13 is a view in front elevation of the transition of FIG. 12.

At the lower end of the bundle assembly, a bulkhead fitting 84 attaches the bundle to the stab plate, and lower tubes 95 are connected to the ends of the tubes 77 of the tubing bundles 71. Tubes 77 from one bundle are connected to a test loop for pressure testing, and may be used as a spare. The other three pairs of tubes 77 are connected to emergency sub-sea isolation shut-off valves. Those lines 77 are held to the exterior of support pipes 96 by supports 97 in accordance with the previously mentioned published application US 2015/0337992 A1, which in turn support rotatable supports 101.

Three tubing bundles 71 are led from the bottom of the conduit 70 and are supported utilizing a first external rotatable support 101 as shown in FIG. 5 attached to a strut channel assembly 97, and a second stacked pair of rotatable supports 101 as shown in FIG. 7 attached to the strut channel assembly adjacent the first support 101.

When two of the tubing bundles 71 are separated from the third, and run to other hydraulic shut-off valves, each run is supported by single rotatable supports 101.

Feed tubes 98 are similarly routed from the hydraulic control system to the upper stab plate 83 using supports 101 attached to strut channel assemblies carried by a cable tray in accordance with the previously mentioned published application US 2015/0337992 A1. The tubes 98 are attached to the tubing 77 through bulkhead fittings 84 in the upper stab plate 83.

All patents, patent applications, and literature mentioned herein are hereby incorporated by reference.

Numerous variations, within the scope of the invention, will occur to those skilled in the art. Merely by way of example, details of the assembly may be varied as by moving the upper Brattberg seal into a flanged adapter or by using different cable clamps. The number of tubing bundles or other elongate elements supported may be varied. For rotatable supports of the first embodiment, mounted inside a conduit, the number of body sectors, hence the number of rotatable bushings, may be increased or decreased. The number of body sectors is limited only by the structural requirements of the body sectors. If the diameter of the conduit relative to the cross-section of the elongate element is large enough, more than one rotatable sleeve/clamp may be sandwiched between adjacent sectors. The shoes associated with each sector may be pivotably mounted rather than slidably. The support of the second embodiment may be held to a structural support in other ways, such as bolting, clipping, or welding. Although the supports of both embodiments are particularly useful with elongate elements of non-circular cross section, they may also be utilized with circular elongate elements. These variations are merely illustrative.

The invention claimed is:

1. A support for a tubing bundle, the tubing bundle comprising a plurality of metal tubes surrounded by an oblong common jacket, the support including a body having at least one sleeve rotatably mounted therein, the sleeve having an oblong opening therethrough sized and shaped to accept the tubing bundle, the sleeve being formed of at least two mating sections and the body being formed of at least two identical mating sections, the sleeve being rotatably mounted in a body opening formed by semi-circular cylindrical openings in adjacent identical body sections.

2. The support of claim 1 wherein the body is formed of at least three identical body sections which are fixed to each other around a number of rotatable sleeves equal to the number of identical body sections to form cylindrical seats for the rotatable sleeves.

3. The support of claim 2 wherein the body sections are bolted or clamped to each other.

4. The support of claim 2 wherein the sleeves are formed of identical sections.

5. The support of claim 4 wherein the sleeve sections are aligned by protrusions and recesses in free arms of the sleeve sections.

6. The support of claim 2 wherein a groove is formed on the periphery of the body opening or periphery of the sleeve, and a complementary circumferential spine is formed in the other of the sleeve or body, to limit axial movement of the sleeve relative to the body.

7. The support of claim 2 wherein the sleeves are held together by protrusions and recesses in the sleeve sections and by being clamped between body sections.

8. The support of claim 2 wherein a groove is formed on the periphery of the body opening or periphery of the sleeve, and a complementary circumferential spine is formed in the other of the sleeve or body, to limit axial movement of the sleeve relative to the body.

9. The support of claim 1 wherein the body sections are bolted or clamped to each other.

10. The support of claim 9 wherein the body is a split pillow block formed of two body sections, the body sections being clamped together by through bolts.

11. The support of claim 10 wherein the bolts are threaded into strut channel clamps adapted to mount the support to a strut channel.

12. The support of claim 10 wherein a plate is mounted to a an upper face of the support by the through bolts, the plate including a portion extending beyond the support, the portion extending beyond the support comprising through-holes, and a second split pillow block formed of two body sections clamped together by through bolts, the through bolts of the second split pillow block extending through the holes in the plate.

13. The support of claim 1 wherein the sleeves are formed of identical sections.

14. The support of claim 13 wherein the sleeve sections are aligned by protrusions and recesses in free arms of the sleeve sections.

15. The support of claim 1 wherein the sleeves are held together by protrusions and recesses in the sleeve sections and by being clamped between body sections.

\* \* \* \* \*